March 24, 1925.
L. C. HUCK ET AL
1,531,185
MULTIPLE DISK BRAKE
Filed March 15, 1920    2 Sheets-Sheet 2
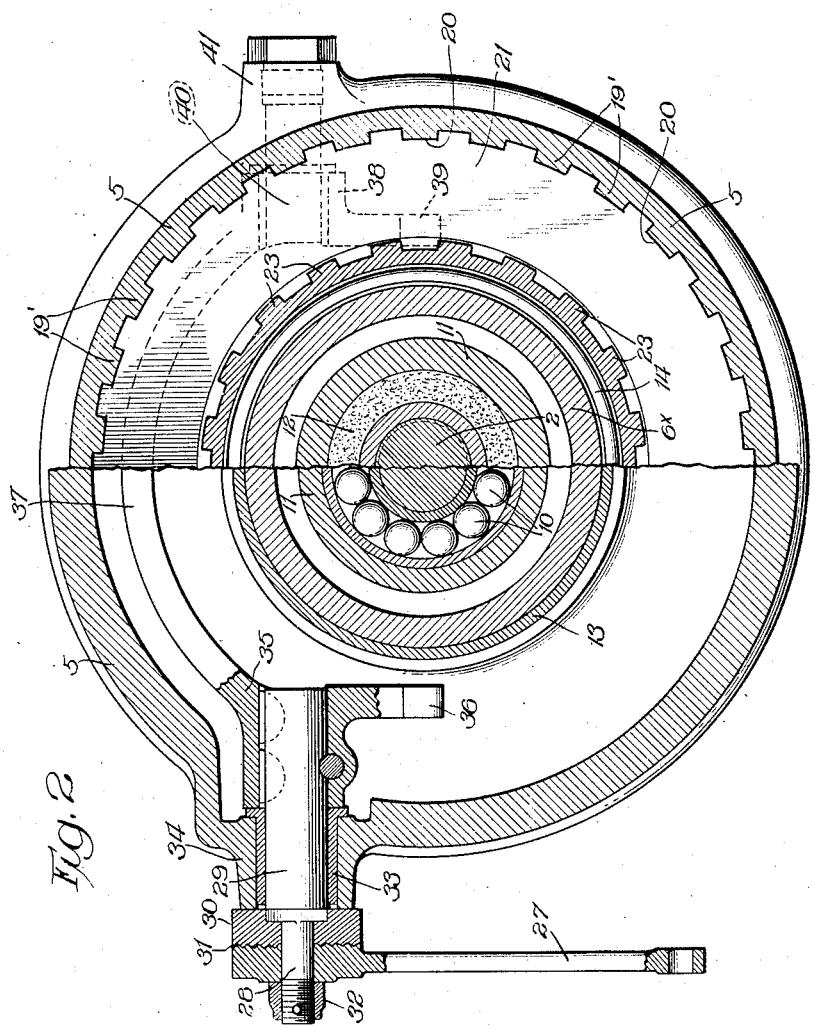
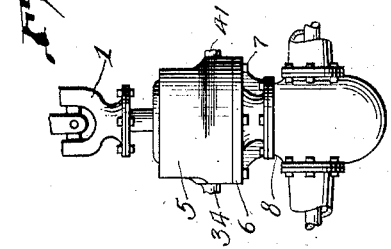
INVENTOR
M. TWIGHT
L. C. HUCK
BY Munn &Co
ATTORNEYS Patented Mar. 24, 1925.

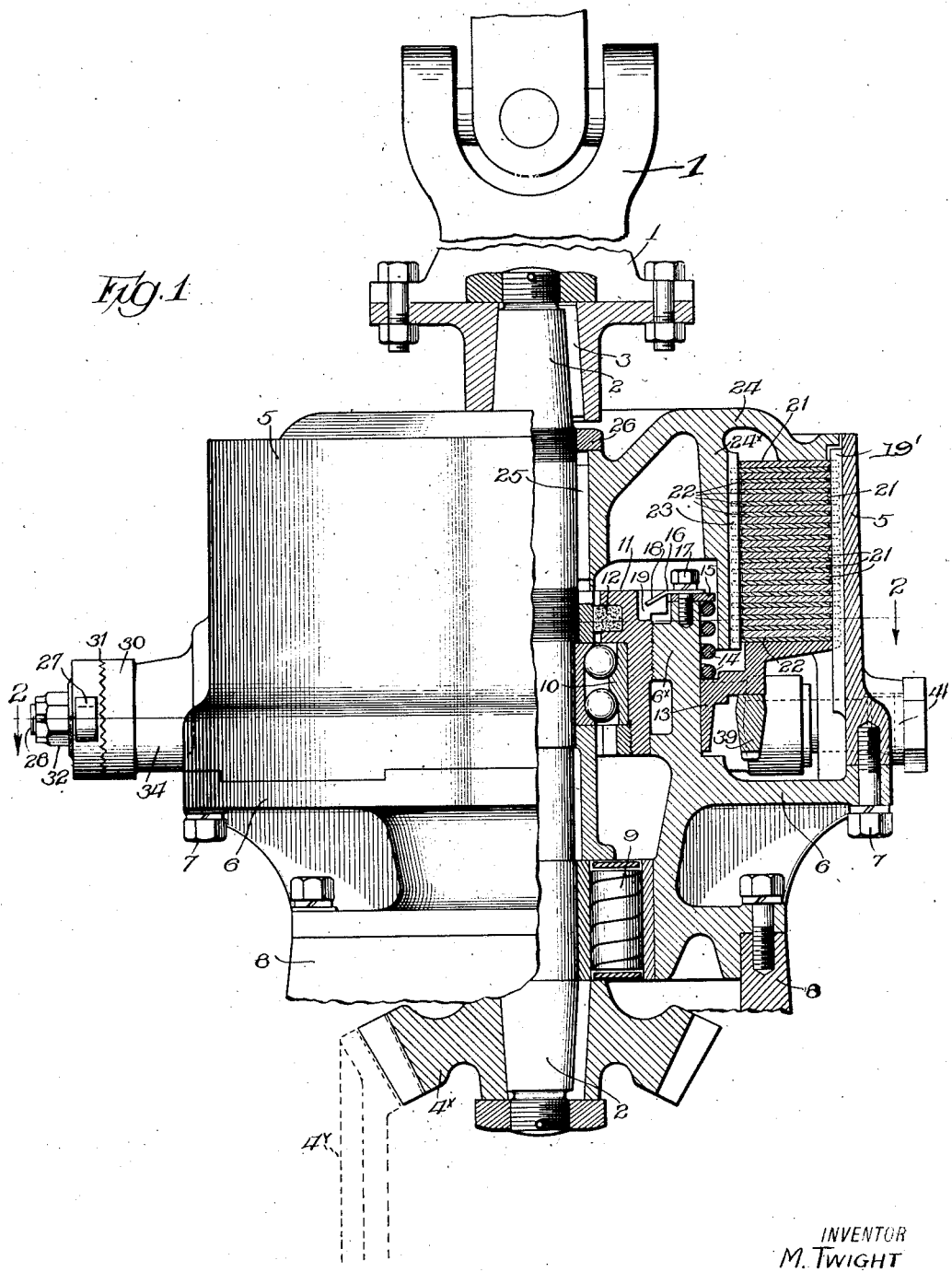

1,531,185

UNITED STATES PATENT OFFICE.

LOUIS C. HUCK AND MARTIN TWIGHT, OF CHICAGO, ILLINOIS, ASSIGNORS TO HUCK AXLE CORPORATION, OF CHICAGO, ILLINOIS, A CORPORATION OF ILLINOIS.

MULTIPLE-DISK BRAKE.

Application filed March 15, 1920. Serial No. 365,811.

*To all whom it may concern:*

Be it known that we, LOUIS C. HUCK and MARTIN TWIGHT, both citizens of the United States, and residents of Chicago, county of Cook, and State of Illinois, have invented a new and useful Improvement in Multiple-Disk Brakes, of which the following is a full, clear, and exact description.

Our invention relates to improvements in brakes for automotive vehicles, and it consists in the combinations, constructions and arrangements herein described and claimed.

An object of our invention is to provide a brake construction in which the wear of the brake and the subsequent loss of time in repairing the same is to a large extent obviated.

A further object of our invention is to provide a brake which is disposed on a drive shaft and which, therefore, has the advantage of a total final gear reduction in the braking effort.

A further object of our invention is to provide a brake of the type described so disposed as to obviate braking strains on the universal joints of the propeller shaft.

A further object of our invention is to provide a construction in which the braking mechanism is readily accessible when desired, and in which the assembly of the parts is easily made.

Other objects and advantages will appear in the following specification, and the novel features of the invention will be particularly pointed out in the appended claims.

My invention is illustrated in the accompanying drawings, forming part of this application, in which—

Figure 1 is a side, partly in section, of the brake as applied to a propeller shaft, and Figure 2 is a section along the line 2—2 of Figure 1.

In carrying out our invention, we make use of a propeller shaft (not shown) similar to that in ordinary use. This shaft is connected with a universal joint 1 which, in turn, is secured to a pinion shaft 2 by a key 3, or in any other suitable manner. At the opposite end of the shaft 2 is a beveled pinion 4$^x$ which is designed to engage a differential gear 4$^y$ shown in dotted lines, in the ordinary manner. Disposed concentrically with the shaft 2 is a housing having cylindrical walls 5, the latter being secured to a frame 6 by means of bolts 7. The frame 6 is, in turn, secured to an axle housing 8. Carried by the frame are roller bearings 9, additional bearings 10 being provided, as clearly shown in the drawings. A ring 11 is provided for holding the bearings 10 in position, and also for carrying a packing gland 12. The ring 11 is arranged to be screwed into a cylindrical extension 6$^x$ of the frame 6.

Surrounding the cylindrical extension 6$^x$ is a ring or pressure shoe 13 which is arranged to slide on the extension, and which is pressed upon by a spiral spring 14 on the outside of the cylindrical extension. The spring 14 is held in position by means of an annular plate 15, the latter being secured in position by means of bolts, such as that shown at 17. A plate 16 has an angularly disposed lug 18 which is arranged to enter grooves 19 in the ring 11 and the cylindrical extension 6$^x$ for the purpose of keeping the ring from turning relatively to the extension.

As will be clearly seen from the drawings, the casing 5 is provided with tongues 19′ which are arranged to enter grooves 20 in a series of annular disks 21. The disks 21 alternate with disks 22 which are provided with grooves arranged to receive tongues 23 on a cylindrical extension 24$^x$ of the clutch member 24. The latter is secured to the pinion shaft 2 by means of a key 25, and is held from longitudinal movement along the shaft by a lock nut 26 which is carried by the shaft 2.

Referring now particularly to Figure 2, we have shown therein an operating handle or lever 27 which is mounted on the reduced end 28 of a shaft 29. The latter bears a plate 30 having radial ridges and grooves 31 arranged to enter similar radial ridges and grooves on the handle 27. A lock nut 32 secures the handle rigidly to the shaft, but permits the adjustment of the relative position of the handle on the shaft. The shaft 29 is journalled in a sleeve 33 carried by an extension 34 of the frame 5. On the inner end of the shaft is secured a sleeve 35 bearing a cam-member 36. A yoke 37 passes around to the opposite side of the device, and is connected with a similar sleeve 38 bearing a cam-member 39 similar to the cam-member 36. A stub shaft 40 is secured in an extension 41 so as to permit rotation of the sleeve 38 when the shaft 29 is rotated.

From the foregoing description of the various parts of the device, the operation thereof may be readily understood. As stated, the clutch member 24 rotates with the pinion shaft 2, while the ring or shoe 13 is held by the spring 14 normally in such position as not to compress the disks 21 and 22 which lie loosely between the casing 5 and the extension 24ˣ.

When, however, it is desired to apply a braking action, the handle 27 is manipulated to revolve the shafts 29 and 40 bearing the cam-members 36 and 39. The latter, thereupon, are forced against the slidable disk or clutch member 13, thus moving it against the tension of the spring 14 and compressing the disks. The frictional pressure thus applied to the disks causes the braking action.

As has been before stated, this braking action eliminates strains on the universal joint, since the braking effort is applied between the joint and the wheels of the vehicle. The location of the brake in the position described also gives the advantage of the total final gear reduction in the braking effort.

The device is easily assembled and is easily taken apart for inspection or repair, since by unloosening the lock nut 26, the clutch member 24 may be moved longitudinally out of the casing 5, whereupon the disks 21 and 22 may be easily removed. The provision of the tongues on the clutch member 24 to enter grooves on one set of disks, and of the tongues on the casing 5 to enter grooves on the other set of disks facilitates assembling of the parts, and, at the same time, positively prevents rotation of the disks with respect to one another.

We claim:

1. The combination with a drive shaft, of a pinion shaft connected to said drive shaft, an axle housing, an axle disposed within said housing and being operatively connected to said pinion shaft, a frame disposed about said pinion shaft and rigidly secured to said housing, said frame having a cylindrical extension, a casing carried by the frame and arranged to surround the pinion shaft, an annular clutch member arranged to slide on said cylindrical extension, a spring arranged to bear on said annular clutch member, means for moving said annular clutch member against the tension of the spring, a second clutch member rigidly secured to the pinion shaft to rotate with it, and a plurality of annular disks surrounding the drive shaft and disposed between said clutch members.

2. The combination with a drive shaft, of a pinion shaft connected to said drive shaft, an axle disposed within said housing and being operatively connected to said pinion shaft, a frame disposed about said pinion shaft and rigidly secured to said housing, said frame having a cylindrical extension, a casing carried by the frame and arranged to surround the pinion shaft, an annular clutch member arranged to slide on said cylindrical extension, a spring arranged to bear on said annular clutch member, means for moving said annular clutch member against the tension of the spring, a second clutch member rigidly secured to the pinion shaft to rotate with it, a plurality of annular disks surrounding the pinion shaft and disposed between said clutch members, and means carried by the casing for preventing a rotary movement of certain of said disks.

3. The combination with a drive shaft, of a pinion shaft connected to said drive shaft, an axle housing, an axle disposed within said housing and being operatively connected to said pinion shaft, a frame disposed about said pinion shaft and rigidly secured to said housing, said frame having a cylindrical extension, a casing carried by the frame and arranged to surround the pinion shaft, an annular clutch member arranged to slide on said cylindrical extension, a spring arranged to bear on said annular clutch member, means for moving said annular clutch member against the tension of the spring, a second clutch member rigidly secured to the pinion shaft to rotate with it, a plurality of annular disks surrounding the pinion shaft and disposed between said clutch members, means carried by the casing for preventing a rotary movement of certain of said disks, and means carried by said second named clutch member for causing the rotation of the remaining disks when said second named member is rotated.

4. The combination with a drive shaft, of a pinion shaft connected to said drive shaft, an axle disposed within said housing and being operatively connected to said pinion shaft, a frame disposed about said pinion shaft and rigidly secured to said housing, said frame having a cylindrical extension, a casing carried by the frame and arranged to surround the pinion shaft, an annular clutch member arranged to slide on said cylindrical extension, a spring arranged to bear on said annular clutch member, means for moving said annular clutch member against the tension of the spring, a second clutch member rigidly secured to the pinion shaft to rotate with it, a plurality of annular disks surrounding the pinion shaft and disposed between said clutch members, said disks comprising two sets, the disks of one set alternating with the disks of the other set, and means for preventing the rotation of one set of disks and for causing the other set of disks to rotate with said second named clutch member.

5. The combination with a drive shaft, of a pinion shaft connected to said drive shaft, an axle housing, an axle disposed within said housing and being operatively connected to said pinion shaft, a frame disposed about said pinion shaft and rigidly secured to said housing, said frame having a cylindrical extension, a casing carried by the frame and arranged to surround the pinion shaft, an annular clutch member arranged to slide on said cylindrical extension, a spring arranged to bear on said annular clutch member, means for moving said annular clutch member against the tension of the spring, a second clutch member rigidly secured to the pinion shaft to rotate with it, a plurality of annular disks surrounding the pinion shaft and disposed between said clutch members, said disks comprising two sets, the disks of one set alternating with the disks of the other set, means carried by the casing for preventing the rotation of one set of disks, and means carried by the second named clutch member for causing the rotation of the other set of disks when said second named member is rotated.

6. The combination with a drive shaft, of a pinion shaft connected to said drive shaft, an axle housing, an axle disposed within said housing and being operatively connected to said pinion shaft, a frame disposed about said pinion shaft and rigidly secured to said housing, said frame having a cylindrical extension, a casing carried by the frame and arranged to surround the pinion shaft, an annular clutch member arranged to slide on said cylindrical extension, a spring arranged to bear on said annular clutch member, means for moving said annular clutch member against the tension of the spring, a second clutch member rigidly secured to the pinion shaft to rotate with it, a plurality of annular disks surrounding the pinion shaft and disposed between said clutch members, said disks being arranged in two sets, the disks of each set having grooves, tongues carried by the casing and arranged to enter the grooves of one set of disks, and tongues carried by the second named clutch member and arranged to enter the grooves of the other set of disks.

LOUIS C. HUCK.
MARTIN TWIGHT.